US008961265B2

(12) United States Patent
Rauscher et al.

(10) Patent No.: US 8,961,265 B2
(45) Date of Patent: Feb. 24, 2015

(54) METHOD AND APPARATUS FOR THE MEASUREMENT-AIDED FINE MACHINING OF WORKPIECE SURFACES, AND MEASURING SYSTEM

(75) Inventors: Herbert Rauscher, Metzingen (DE); Joachim Klima, Notzingen (DE)

(73) Assignee: Nagel Maschinen-und Werkzeugfabrik GmbH (DE)

( * ) Notice: Subject to any disclaimer, the term of this patent is extended or adjusted under 35 U.S.C. 154(b) by 946 days.

(21) Appl. No.: 13/042,518

(22) Filed: Mar. 8, 2011

(65) Prior Publication Data

US 2011/0223833 A1 Sep. 15, 2011

(30) Foreign Application Priority Data

Mar. 9, 2010 (DE) .......... 10 2010 011 470

(51) Int. Cl.
*B24B 49/12* (2006.01)
*B23Q 17/24* (2006.01)
*B24B 33/02* (2006.01)
*B24B 33/04* (2006.01)
*B24B 35/00* (2006.01)

(52) U.S. Cl.
CPC ............ *B23Q 17/2471* (2013.01); *B24B 33/02* (2013.01); *B24B 33/04* (2013.01); *B24B 35/00* (2013.01); *B24B 49/12* (2013.01)
USPC .................................. 451/6; 451/51; 451/27

(58) Field of Classification Search
USPC .................. 451/6, 470–485, 51, 27
See application file for complete search history.

(56) References Cited

U.S. PATENT DOCUMENTS

| | | | |
|---|---|---|---|
| 3,605,909 A | | 9/1971 | Lemelson |
| 4,455,789 A | * | 6/1984 | Gehring .......... 451/156 |
| 6,203,402 B1 | | 3/2001 | Hildebrandt |
| 7,179,151 B1 | * | 2/2007 | Bottema et al. ........ 451/6 |
| 8,512,095 B2 | * | 8/2013 | Nagel et al. .......... 451/8 |
| 2010/0236314 A1 | | 9/2010 | Weigmann et al. |

FOREIGN PATENT DOCUMENTS

| | | |
|---|---|---|
| DE | 3827892 | 3/1990 |
| DE | 40 20 551 A1 | 1/1992 |

(Continued)

OTHER PUBLICATIONS

Uebelhor, P., Inprozess-Geometriemessung beim Honen, vol. 56 (1994), pp. 1-21, 40-53, 148-151.

(Continued)

*Primary Examiner* — Robert Rose
(74) *Attorney, Agent, or Firm* — Akerman LLP

(57) ABSTRACT

In the case of a method for the material-removing fine machining of a workpiece surface of a workpiece, in particular for the honing or finishing of workpiece portions having substantially rotationally symmetrically curved workpiece surfaces, at least one fine machining tool machines the workpiece surface and, by means of a measuring system, a measurement of the workpiece surface is performed. In this case, at least one measuring position, radar radiation is directed onto the workpiece surface, and the radar radiation reflected from the workpiece surface is acquired and evaluated for the purpose of determining at least one surface measurement value.

21 Claims, 4 Drawing Sheets

(56) References Cited

FOREIGN PATENT DOCUMENTS

| | | |
|---|---|---|
| DE | 19813041 | 10/1999 |
| DE | 10119669 | 10/2002 |
| DE | 10 2007 045 381 A1 | 4/2008 |
| DE | 10 2009 005 745 B4 | 9/2011 |
| EP | 1932620 | 9/2010 |
| WO | 03/027709 A1 | 4/2003 |

OTHER PUBLICATIONS

Schmid, J., Spanende Bearbeitung von Gusseisen mit Vermikulargraphit, konstruieren + gieBen 22, No. 4, pp. 33-38.

Search Report dated Mar. 9, 2010 in DE Application No. 10 2010 011 470.7.

Office Action issued in connection with German Patent Application No. 10 2010 044 470.7.

* cited by examiner

METHOD AND APPARATUS FOR THE MEASUREMENT-AIDED FINE MACHINING OF WORKPIECE SURFACES, AND MEASURING SYSTEM

This application claims benefit from German patent application No. 10 2010 011 470.7 filed on Mar. 9, 2010, the disclosure of which is incorporated into the present application by reference.

BACKGROUND

The invention relates to a method for the material-removing fine machining of a workpiece surface of a workpiece, to an apparatus for the material-removing fine machining of a workpiece surface of a workpiece, and to a measuring system that can be used within the scope of the method and the apparatus.

Preferred fields of application are the measurement-aided fine machining of bores by internal honing, or the measurement-aided fine machining of largely rotationally symmetrically curved outer surfaces of workpieces by belt finishing or super-finishing or external honing, a measurement for determining the macro-shape and/or surface structure of the workpiece surface being performed in conjunction with the fine machining.

DESCRIPTION OF THE PRIOR ART

Honing is a process of removing material by means of geometrically undefined cutters, wherein multi-cutter honing tools execute a cutting motion consisting of two components, which results in a characteristic surface structure of the machined inner surface, with crossed-over machining marks. Honing enables finish-machined surfaces to be produced, which meet extremely stringent requirements with regard to dimensional and shape tolerances and in respect of the surface structure. Accordingly, in the case of engine construction, for example, cylinder working surfaces, i.e. inner surfaces of cylinder bores in an engine block or in a cylinder sleeve to be fitted in an engine block, and bearing surfaces for shafts, are subjected to machining by honing. In the case of the machining of cylinder working surfaces, a plurality of differing, successive honing operations are typically performed, for example a pre-honing, to produce the specified macro-shape of the bore, and a finish honing, by which the surface structure required on the finished workpiece is produced. Measurement steps can be used to check the success of the machining.

Frequently, for the fine machining of rotationally symmetrically curved workpiece outer surfaces, so-called super-finishing or belt finishing is used, wherein belt-shaped grinding material is pressed onto the outer contour to be machined, by means of appropriately shaped pressing devices. The machining motion required for the removal of material is produced through short-stroke oscillating axial motion of the grinding material in the axial direction in combination with rotation of the machined workpiece portion about its axis. Curved workpiece outer surfaces, for example on piston rods or the like, can also be machined by external honing. In the case of curved workpiece outer surfaces, also, it is frequently desired to use measuring means to measure the success of the machining.

In the case of honing, normally, very close tolerance specifications must be observed in respect of the macro-shape and size of the bore quantified, for example, by the bore diameter. Insofar as possible, therefore, in-process measuring systems are employed, which can determine the current diameter of the bore (actual diameter) during the honing process and after individual honing stages. This value can then be used for feedback control the honing process, e.g. as part of a switch-off feedback control.

Also known are honing apparatuses having a post-process measuring station that succeeds the machining station. In a post-process measuring station, the bore diameter can be determined at a plurality of locations in the bore, and the thus obtained items of information can be linked to one another. Information about the macro-shape of the produced bore can thus be obtained, in addition to the diameter information. Frequently, post-process measuring stations serve primarily for quality control, i.e. for distinguishing between acceptable parts and non-acceptable parts. It is also possible to incorporate a post-process measuring station into the feedback control circuit of a honing installation, and to use the measurement results for the feedback control of preceding honing stages. DE 38 27 892 C2 discloses a honing apparatus having a post-measuring station, wherein the measurement results are used for the feedback control of the radial advance of the honing stones in the case of a honing tool having a large radial travel.

Nowadays, the described measurements are usually performed by means of pneumatic measuring systems, which operate according to the nozzle-baffle principle. In these systems, also referred to as an "air measuring system", compressed air flows out of measuring nozzles in the direction of the bore wall. In the case of in-process measurements, the measuring nozzles are integrated into the honing tool; in the case of post-process measurements, they can be fitted in a special plug gauge. The resultant back pressure in the region of the measuring nozzles serves as a measure for the distance between the measuring nozzle and the bore wall. A measuring transducer connected to the measuring nozzle via a pressure line effects conversion of the (pneumatic) pressure signal into a voltage signal that can be processed further electrically. The bore diameter can be determined by means of two diametrically opposite measuring nozzles.

Pneumatic measuring devices allow non-contacting measuring that is non-dependent on the material of the measurement object and, in the scope of their measurement span, high measuring accuracies in the order of magnitude of a few micrometres. The measurement span is relatively limited, however. To enable significant measurement values to be recorded, the air measuring nozzles must be disposed within a certain, relatively closely delimited distance range (typically a few 100 µm, e.g. approximately 200 µm) from the bore wall. The breadth of the then usable, linear measurement span is typically between 100 µm and 200 µm. In the case of static measurements (non-rotating measuring tool), the repetition accuracy of the recorded measurement values is less than 1 µm. Since the pneumatic measuring system requires a certain time for setting a pressure equilibrium in the measuring system, the measuring dynamic is limited, and normally only a maximum of 10 to 20 measurement values per second are determined. In addition, between the air measuring nozzle and the measuring transducer that converts the pressure signal into an electrical signal that can be machine-processed, there is a chain of potential interferences, which can negatively affect the accuracy of the measurement.

In the dissertation document "Inprozess-Geometriemessung beim Honen" [In-process geometry measurement in honing] by P. Uebelhör, in: Forschungsberichte aus dem Institut für Werkzeugmaschinen und Betriebstechnik der Universität Karlsruhe (edited by Prof. Dr.-Ing. H. Weule), volume 56 (1994), other path measuring systems that operate in a non-contacting manner were investigated in respect of their suitability for in-process geometry measurement in honing. For this purpose, tests were conducted with an eddy-current measuring system and with a capacitive measuring system.

In the case of fine machining apparatus for machining cylindrically curved workpiece outer surfaces, tactile measuring systems are used. DE 199 25 077 A1 discloses an apparatus for belt finishing of curved workpiece surfaces, wherein the grinding belt is pressed onto the surface of the workpiece by means of two machining shoes. At the same time, the surface to be machined is measured by means of an in-process measuring device. The described in-process measuring device measures the diameter of the workpiece in that two tactile measuring tips sit at mutually opposing locations on the surface of the workpiece. Although alternatives thereto are mentioned, namely an optical, pneumatic or hydraulic measuring device, they are not described in detail.

SUMMARY

It is an object of the invention to provide a method and an apparatus for the measurement-aided fine machining of workpiece surfaces, and a measuring system that can be used within the scope of the method and the apparatus, which are distinguished by a high measuring dynamic and high measuring accuracy. If necessary, it is to be possible for the measuring system to be integrated into a fine machining tool for performing in-process measurements in a manner requiring little in respect of structure.

To achieve these and other objects, the invention, according to one formulation, provides a method for the material-removing fine machining of a workpiece surface of a workpiece, comprising:

machining the workpiece surface using at least one fine machining tool; and measuring the workpiece surface by means of a measuring system, wherein measuring comprises:

directing radar radiation onto the workpiece surface at least one measuring position;

acquiring radar radiation reflected from the workpiece surface, and evaluating the reflected radar radiation to determine at least one surface measurement value.

Advantageous developments are specified in the dependent claims. The purport of all claims is rendered through reference to the content of the description.

The measurement of the workpiece surface occurs in conjunction with a fine machining of the workpiece surface, wherein material is removed from the workpiece, e.g. by machine cutting. Temporally, the measurement can be performed before the fine machining, during the fine machining and/or after the fine machining. During the measurement, radar radiation is directed onto the workpiece surface at least one measurement location, and the radar radiation reflected from the workpiece surface is acquired and evaluated for the purpose of determining at least one surface measurement value. Thus, at least one sensor arrangement, having at least one radar sensor, is used to measure the workpiece surface.

Within the scope of this application, the term "radar radiation" denotes technically generated electromagnetic waves from a frequency range, useful to radar engineering, of between approximately 30 MHz and 300 GHz and typical wavelengths from the range between approximately 1 mm and approximately 10 m. This frequency range includes, in particular, the microwaves having typical wavelengths of between 1 mm and 1 m, which corresponds to a frequency range from about 300 MHz to about 300 GHz.

In the case of preferred embodiments, the frequencies of the radar radiation are in a range of between 20 GHz and 100 GHz, which corresponds to typical wavelengths in the range of between approximately 3 mm and 15 mm. Wavelengths in the range of a few millimeters are in, or only slightly above, the order of magnitude of typical measurement spans sought for the measurement task. As a result, distance measurements, in particular, can be performed with high precision by means of evaluation of phase shifts with, at the same time, a relatively small amount of evaluation resource.

It has been found that radar radiation, which conventionally has been used primarily to measure large distances and to measure angles, or directions, between a transmitter and an object at great distance, can be used to great advantage for process-related measurements in the domain of material-removing fine machining. In this context, the term "radar sensor" denotes an electrically operated technical device, which emits radar radiation, bunched as a primary signal, by means of a transmitter and, by means of a receiving unit, receives as a secondary signal the echo reflected from the workpiece surface and prepares it for evaluation. It is exclusively the signal that is passively reflected from the workpiece surface that is evaluated in this case, in the manner of primary radar devices. In the case of a radar sensor, the same device, e.g. a transmitting/receiving antenna, can be used to convert electrical output signals into electromagnetic waves of the primary signal and to convert the electromagnetic waves of the secondary signal into electrical signals that can be evaluated.

In the measurement, there are no particular requirements in respect of the properties of the workpiece constituting the workpiece surface. The material of the workpiece surface may be electrically conductive or non-conductive, such that, in particular, all metallic and ceramic materials, but also even plastics, can be measured. The technique functions in a non-contacting manner, such that the machined workpiece surface is not impaired, e.g. scratched or soiled, by the measurement. The use of radar radiation allows high absolute measurement accuracies in the range of fractions of micrometres, while at the same time the usable measurement span can be very large in comparison therewith and can lie, for example, in the range of one or a plurality of millimeters. Furthermore, in the case of radar sensors, the sensor dimensions can be relatively small, such that, for the purpose of in-process measurements, radar sensors can, if appropriate, be integrated into a fine machining tool, with a reasonable amount of structural resource and with the functionality of the fine machining tool being fully retained. In addition, a measurement dynamic that is significantly greater in comparison with air measurement (higher number of measurements per unit of time) allows new measurement possibilities that are very useful for fine machining.

With regard to the fact that most material-removing fine machining processes are performed with the use of liquid production auxiliaries, such as honing oil or other cooling lubricants, a further substantial advantage consists in that measurements by means of radar radiation can, in principle, also be performed in the presence of cooling lubricant. If the wave propagation occurs in a liquid, properties of the liquid that are relevant to the wave propagation, e.g. the permeability, are taken into account in the evaluation and, if necessary, in the selection of the wavelengths used. A permanent cleaning of the production auxiliary during the machining process can be advantageous in order to ensure defined conditions for the wave propagation.

The information content of the radar radiation (secondary signal) reflected from the workpiece surface is analyzed in order to determine one or more surface measurement values.

A surface measurement value can provide, for example, information about macroscopic dimensions and/or the macro-shape of the workpiece surface. In the case of workpiece surfaces that are curved in a substantially rotationally symmetrical manner (for example, inner surfaces of cylindrical bores or outer surfaces of cylindrical workpiece portions on shafts), the surface measurement value can contain information about the diameter and/or the macro-shape of the surface, in order to determine therefrom, for example, information about dimensional accuracy, roundness, cylindricity and/or profiling in the axial direction (conicity, barrel shape, convexity, curvature widening, etc.). If appropriate, it is also possible to deduce information about the position of the axis of symmetry of a cylindrically curved workpiece portion of a bore in relation to a specified position. A surface measurement value can also represent information about the microscopic surface condition of the workpiece surface, in order, for example, to determine particulars about the roughness of the surface and/or about the distribution and/or alignment of machining marks of the fine machining process.

The radar radiation reflected from the workpiece surface can be acquired and evaluated in differing ways. In the case of a number of embodiments, a phase shift between the emitted primary radiation and the secondary radiation reflected from the workpiece surface is determined and evaluated for the purpose of determining at least one surface measurement value (phase measurement). It is particularly favorable in this case if the effective wavelength is adapted to the order of magnitude of a typical measurement distance in such a way that the phase shift is less than a wavelength. The results of the phase measurement can then be interpreted in an unambiguous manner without a large additional resource requirement. The wavelength in air can be, for example, between 3 mm and 15 mm, if typical measurement distances are in the order of magnitude of 1 mm. It is also possible to determine the propagation time of the radar radiation between an emission instant and a receiving instant, and to evaluate it for the purpose of determining at least one surface measurement value (propagation time measurement).

Both phase measurement and propagation time measurement make it possible, for example, to determine with precision the geometric distance between a radar sensor and a workpiece surface, in order, for example, to deduce information about the diameter of a bore delimited by the workpiece surface and/or about the macro-shape of the workpiece surface. In the case of a measurement of a substantially cylindrically curved workpiece surface (e.g. bore inner surface or outer surface of a cylindrical workpiece portion of a shaft, or the like), reflected radar radiation can be acquired, for example, at least one pair of diametrically opposite measurement locations and evaluated for the purpose of determining a diameter value of the bore delimited by the workpiece surface.

It is also possible that measurement values for a multiplicity of measurement locations on the workpiece surface be acquired, and that at least one shape measurement value, representing the macro-shape of the workpiece surface, be determined from the measurement values. For this purpose, for example, the measurement values from at least 10 or at least 100 or at least 1000 or more measurement locations can be evaluated jointly. In order to achieve this with a small number of radar sensors, for example one or two, in the case of one embodiment the workpiece and the radar sensor arrangement for the measurement are moved relative to one another, and the measurement values are acquired in temporal succession for the multiplicity of measurement locations. For example, at least 50 or at least 100 or at least 200 or at least 1000 measurement values can be recorded in the circumferential direction of a substantially cylindrically curved workpiece portion, in order to determine precise information about the roundness or deviation therefrom. If such circumferential information is acquired at a plurality of positions that are spaced apart axially, it is possible to determine particulars relating to roundness, convexity, barrel shape, conicity, etc. of a bore inner surface or of a workpiece outer surface.

Complex shape measurements can be performed with high precision in a relatively short time by means of radar beams. For this purpose, in the case of a number of embodiments, the radar radiation is irradiated in pulses, at a scan frequency of at least 0.1 kHz, onto the workpiece surface, the scan frequency preferably being at least 1 kHz. In this way, at least 100 or at least 1000 measurement locations can be measured per second, such that complete measurements with high positional resolution are possible within a very short time.

The high scan frequencies that can be achieved allow further optimizations of the measurement process. For example, statistical methods of error calculation and error correction are possible. For this purpose, in the case of a number of method variants, measurement locations are acquired multiple times during the measurement and, from the plurality of measurement values for a measurement location, a statistically evaluated measurement value is calculated for the measurement location. If measurement locations are passed over multiple times, a plurality of measurement values can be determined for each surface segment of the workpiece surface. Through plausibility calculation, measurement errors can be eliminated to a large degree, as a result of which the quality of the measurement result and its reliability are increased. In addition, average value calculations from many measurement values can provide more reliable results than in the case of few measurement values, such that confidence intervals become smaller, which additionally improves the quality of the measurement results. More reliable measurement values require fewer counter-checks, which, in comparison with conventional measuring systems, reduces the measurement resource requirement and the measuring capacity, in respect of personnel and technology, to be provided by the operator of a fine machining installation. Better measurement results with, if applicable, reduced costs can therefore be achieved.

In the case of a number of embodiments, at least one surface structure measurement value, representing the surface structure of the workpiece surface, is determined from the radar radiation reflected from the workpiece surface. This surface structure measurement value can be, for example, a measure of the roughness of the workpiece surface and/or of the orientation of machining marks or the like.

Method variants wherein an intensity of the radar radiation reflected from the workpiece surface is determined and evaluated for the purpose of determining at least one surface measurement value have proved effective for, in particular, determining surface structure measurement values and/or information about the surface shape. This can be understood qualitatively, for example, as follows. If a primary signal is irradiated substantially perpendicularly onto a smooth workpiece surface, the radar radiation is reflected back substantially directly to the radar sensor, such that the intensity of the received signal can be, comparatively, relatively high. If, on the other hand, the measured workpiece surface is highly structured (e.g. very rough), then the radar radiation is reflected back into a greater solid angle region, such that, in comparison to a smooth workpiece surface, only a lesser proportion of the radiation intensity gets back to the emission location at the radar sensor. By means of corresponding calibration, the microstructure of the surface can therefore be inferred from the intensity of the reflected radar radiation.

If the intensity of the radar radiation reflected from the workpiece surface is acquired at a plurality of positions within an extended acquisition range, information about the angular distribution of the reflected radar radiation can also be determined two-dimensionally (in a particular plane) or three-dimensionally (in space). As a result, it is possible to determine, for example, accumulations of backscatter angles, from which it is possible to infer, for example, the orientation of machining marks on the workpiece surface and/or the macroscopic orientation of the surface in relation to the incident radar beam.

A cooling lubricant (honing oil or honing emulsion), which promotes the removal of chips and cools the machining region, is normally used during honing. Cooling lubricants are also employed in external fine machining. In these cases, the evaluation of the measurement results of the radar measurement is normally more complex than in the case of wave propagation in gas. To avoid such problems it is provided, in a number of embodiments, to perform a cleaning of the measurement span by blowing clear the measurement span by means of air or by means of another appropriate cleaning gas. This enables the region to be measured to be cleaned of, for example, honing chips and residues of honing oil, at least to such an extent that the measurement is not affected by such residues. For this purpose, there can be one or more blowing nozzles in the region of a radar sensor, which blowing nozzles are connected to a fluid channel system and which, by means of compressed air, blow clear the space between the sensor and the workpiece surface. If appropriate, the compressed air can be supplied via those lines that are used in conventional air measuring systems.

The measurement is preferably performed as an in-process measurement. This means, in particular, that the measurement of the workpiece surface is performed immediately after a preceding fine machining step and/or immediately before a succeeding fine machining step and/or during the fine machining on the workpiece surface on the workpiece clamped in a machining clamping device. There is therefore no need for transport to a separate measuring station.

Typically, the workpiece surface in this case is measured by means of at least one radar sensor fitted on a fine machining tool. The fine machining tool thus serves as a sensor carrier for the radar sensor, such that the associated manipulators for the fine machining tool, for example the spindle used to carry the honing tool, or a machining arm of a finishing machine, and their control system can be used to bring the radar sensor into the measuring position close to the workpiece surface, if appropriate to move the radar sensor relative to the workpiece surface and, following completion of the measurement, to move the radar sensor back out of the measuring position. This enables a substantial saving to be made in structural resource for a separate measuring station.

Preferably, the measurement results are used directly for process feedback control via the machine control system of the fine machining installation. In the case of a variant, it is provided for this purpose that the measurement is performed during and/or after a fine machining step, a surface actual value that represents the current condition (in particular, macro-shape, diameter and/or surface condition) of the workpiece surface is determined, and a difference between the surface actual value and a corresponding surface specified value is processed for the purpose of controlling the fine machining tool. This feedback control circuit enables an improved precision of the fine machining process to be achieved, and the yield of acceptable parts is increased substantially.

The invention also relates to a measuring system, for measuring a fine-machined workpiece surface of a workpiece, that is suitable for performing the method described in this application. The measuring system has at least one radar sensor arrangement having at least one radar sensor.

The invention also relates to a fine machining apparatus, which is assigned to at least one measuring system according to the invention. The measuring system can be integrated, for example, into a honing machine or into a finishing machine. It is also possible to design the measuring system as a measuring station that is separate from a machining center.

Preferably, the measuring system is designed as an in-process measuring system. It is provided for this purpose, in the case of preferred variants, that the radar sensor is fitted on the fine machining tool of the apparatus, such that the fine machining tool serves as a sensor carrier for the radar sensor. In the case of a honing apparatus, at last one radar sensor can be fitted on a honing tool. In the case of a finishing apparatus, a radar sensor can be fitted on a finishing arm, which is provided to press, by means of a pressing device, abrasive grinding material (e.g. grinding belt or honing stone) onto the outer surface of a workpiece portion to be machined.

The measuring system can be configured, for example, as a diameter measuring system, shape measuring system and/or roughness measuring system. Depending on the measurement task, the radar sensor arrangement can have one or more radar sensors. Their spatial arrangement and the evaluation of the radar radiation reflected from the workpiece surface determine which surface measurement values are acquired and what information about the measured workpiece surface is deduced therefrom.

An evaluation device of the measuring system can be connected to a control device of the fine machining center in a signal transmitting manner, or be part of this control device, and, together with the latter, constitute a feedback control device for controlling the machining on the basis of measurement data (surface measurement values) obtained by means of the measuring system. For example, the machining time and/or the contact pressure of cutting material (e.g. honing stones or grinding belt) can be controlled on the basis of surface measurement values of the measuring system, to enable close production tolerances to be maintained, even in the case of larger series of workpieces to be machined.

Apart from being disclosed by the claims, the preceding and further features are also disclosed by the description and the drawings. The individual features in this case can each be realized on their own or multiply, in the form of sub-combinations, in the case of an embodiment of the invention and in other domains, and constitute advantageous embodiments. Preferred embodiments are explained with reference to the appended drawings.

DETAILED DESCRIPTION OF PREFERRED EMBODIMENTS

Exemplary embodiments of the invention are to be explained first using the example of the fine machining process "honing".

Figure 1:
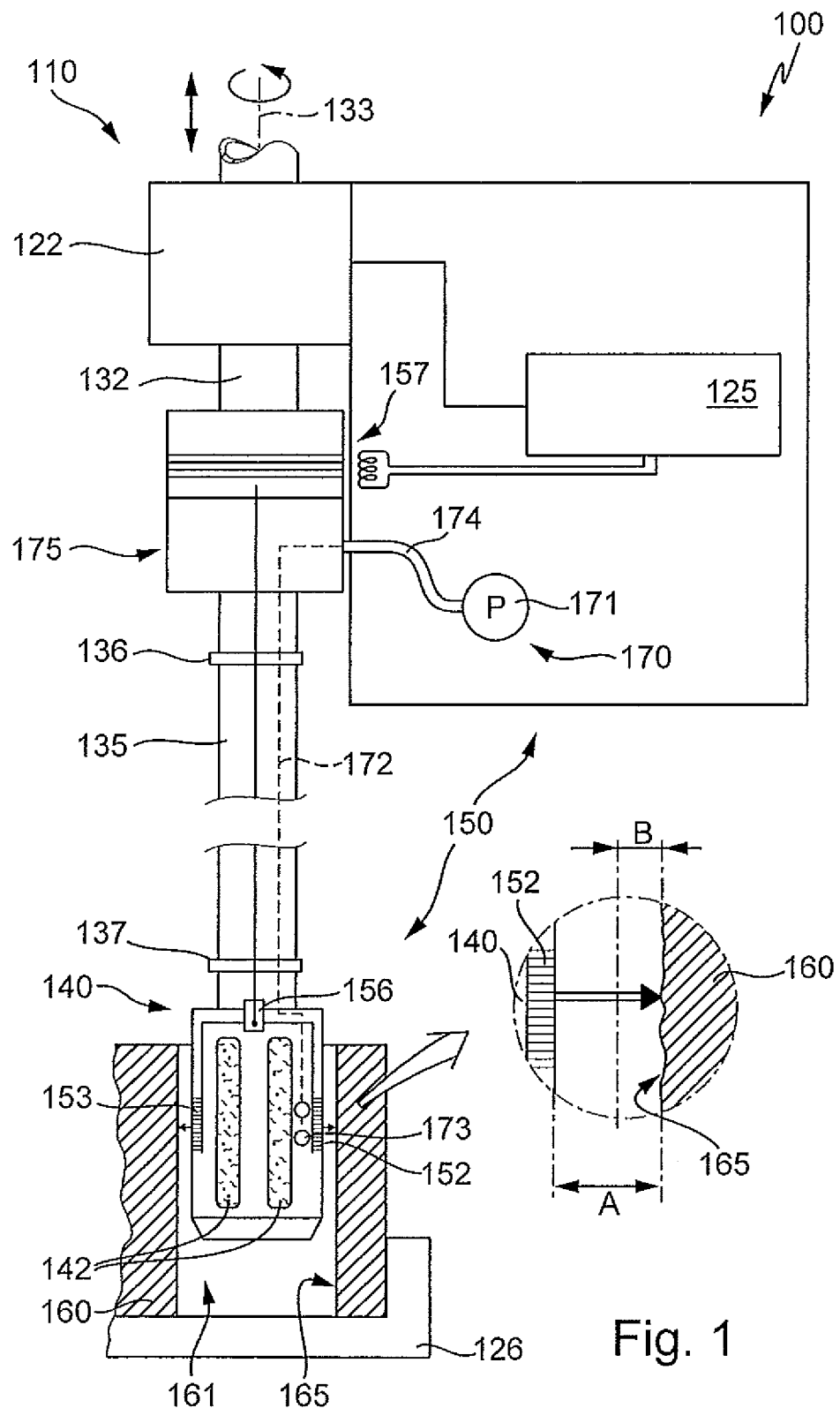
FIG. 1 shows a schematic view of an embodiment of a honing machine, for the machining by honing of cylindrical inner surfaces of bores in workpieces, having an integrated measuring system that has a plurality of radar sensors integrated into the honing tool.

Shown in FIG. 1 is a schematic representation of an embodiment of a honing machine 100, designed as a vertical honing machine, which can be used by way of example for the machining by honing of substantially cylindrical inner surfaces of bores in workpieces for engine construction. The multi-spindle honing machine 100 has a plurality of honing units, of which only one honing unit 110 is shown in FIG. 1. The honing unit 110 comprises a stationary subassembly and a subassembly that is movable relative to the stationary subassembly. The movable subassembly includes a honing spindle 132, which is mounted with a vertically extending spindle axis 133, and a drive rod 135, which is coupled to the lower, free end of the honing spindle 132 by means of a spindle-side joint 136. A honing tool 140 is coupled, so as to be movable in a limited manner, to the lower, free end of the drive rod by means of a multiaxial joint 137. By means of a spindle drive 122, the honing spindle can be rotated about its spindle axis 133 and, in addition, can be put into an axial to and fro motion in order to generate the superposition, typical of honing, of a rotational motion with an axially oscillating motion. By means of an electromechanical and/or hydraulic advance system, not represented (cf. FIG. 2), the honing strips 142 disposed on the honing tool 140 can be advanced or withdrawn in the radial direction, in order to set the effective diameter of the honing tool that is desired for the machining. The spindle drive 122 and the advance system are controlled by means of a control unit 125 of the honing machine.

FIG. 1 shows the honing machine in the case of the machining of a workpiece 160, which may be, for example, an engine block for an internal combustion engine, or a cylinder sleeve to be fitted into an engine block. The workpiece is clamped into a clamping device 126 of the honing machine, and is in the machining position. The honing tool has been introduced into a substantially cylindrical bore 161 of the workpiece, in order to achieve, by means of an appropriately designed honing process, the macro-shape of the bore, having a predefined diameter, and a specified surface structure of the bore inner surface 165, which is curved in a substantially concavely cylindrical manner. In this example, this bore inner surface is the workpiece surface to be machined by means of the fine machining process internal honing.

For each of its honing units, the honing machine has a measuring system 150 that, during the machining by honing, allows the current diameter of the bore and other surface measurement values that characterize the current state of the machined bore and of the bore inner surface to be determined in the manner of an "in-process measurement", corresponding signals to be transmitted to the control system 125 of the honing installation and, in this way, a process feedback control of the honing process to be achieved. By means of an in-process measurement, the current diameter dimension of the bore, for example, can be monitored continuously during honing. When the sought specified dimension has been achieved, the machining can be terminated through the control unit 125 of the honing machine.

The measuring system 150, also referred to in the following as a "radar measuring system", comprises a pair of electrically controllable radar sensors 152, 153, which are disposed diametrically opposite one another on the honing tool 140, between the honing strips 142 that are spaced apart in the circumferential direction, in the axial working range of the honing strips.

From each of the radar sensors, an electrical measuring line leads, via a first interface 156 between the honing tool and the drive rod 135, and via a second interface 157 between the honing spindle 132 and the stationary part of the honing machine, to the control unit 125 of the honing machine. The control unit 125 comprises an evaluation device for the measurement signal, such that the measurement signals delivered by the radar sensors can be processed to control the honing process. The first interface 156 can have, for example, a plug-in connection, which can transfer both the electrical power, for supplying the radar sensors, and measurement signals. The second interface has an inductive transformer 157, which has a stationary coil arrangement connected to the control unit 125 and, fitted at a short distance from which coil arrangement, has a coil arrangement that is wound around the honing spindle 132. The coil arrangements serve, on the one hand, to transfer the measurement signals, present in an analog or digital form, between the radar sensors 152, 153 and the control unit 125 in a non-contacting manner and, on the other hand, to transfer the electrical supply power for the radar sensors.

The honing machine has an integrated pneumatic cleaning device 170 for cleaning the measurement span used by the radar sensors, by blowing clear the measurement span by means of compressed air. For this purpose, there is fitted in or outside the stationary subassembly of the honing machine a compressed-air generator 171, which is equipped with a compressor and from which compressed air is routed, via a pressure line 172, to a plurality of blowing nozzles 173 fitted in the honing tool, close to the radar sensors. The pressure line comprises a stationary pressure line portion 174 constituted, for example, by a flexible hose, a pneumatic rotary transfer device 175, frequently also referred to as an air distributor, and a plurality of compress-air channels, which lead from the air distributor to the blowing nozzles, and which are represented only schematically in FIG. 1. Those devices that, in conventional honing machines, are used as part of a pneumatic measuring system can be used for the pneumatic cleaning device. They are therefore not described in greater detail here.

Figure 2:
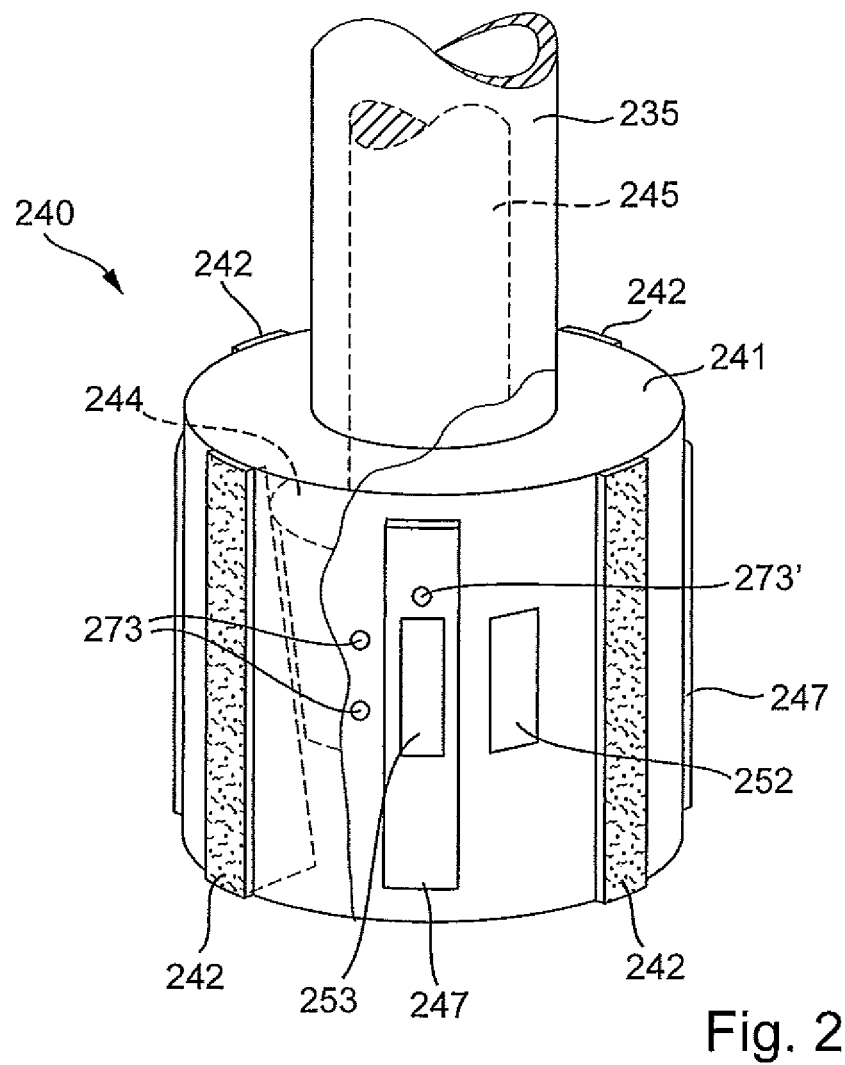
FIG. 2 shows, schematically, various possibilities for fitting radar sensors on an internal honing tool.

In the case of the embodiment in FIG. 1, two radar sensors 152, 153 are fitted at diametrically opposite locations in the tool body of the honing tool 140. FIG. 2 shows, schematically, various possibilities for fitting radar sensors on a honing tool 240. The honing tool, which is fitted in a rigid or jointed manner at the lower end of a drive rod 235 has a substantially cylindrical tool body 241, on the circumference of which are fitted four honing strips 242, which are offset circumferentially by 90° in each case and which can be advanced radially. The honing strips, which are provided with an abrasive cutting facing, sit on metallic honing strip carriers, which are mounted so as to be radially movable in corresponding recesses of the tool body 241. The inwardly directed back sides of the strip carriers are sloped and, in the manner of a spline drive, act together with the conical outer surface of an advance cone 244, which is fastened to the lower end of an advance rod 245 that is guided in an axially moveable manner in the drive rod. Axially elongate guide strips 247, whose outer faces directed toward the workpiece are not fitted with cutting facing, but are relatively smooth and therefore noncutting, are fastened to the outer circumference of the tool body, in each case centrally between two honing strips that are adjacent in the circumferential direction. Honing tools having such a basic structure are known per se, and are therefore not described in greater detail.

A special feature of this honing tool consists in that it is used as a sensor carrier for radar sensors of a radar measuring system. For this purpose, a rectangular recess, into which a radar sensor 252 is fitted, is provided un a free angular segment of the outside of the tool body 241. In the case of the example, radar sensors of relatively small structure, having a size of approximately 5*12*30 mm, are used. As an alternative to a disposition of the radar sensor on a free tool segment, or in addition thereto, a radar sensor can also be integrated into a guide strip, as shown exemplarily at the radar sensor 253. A guide strip has a corresponding recess for this purpose. Diametrically opposite positions can likewise carry a radar sensor. Two or more radar sensors can be distributed in a uniform or non-uniform manner over the circumference and/or over the length of the tool.

As viewed in the axial direction, the radar sensors of the example are fitted approximately at half the height of the guide strips, or honing strips. Provided in the circumferential direction on the tool body, in addition to the radar sensors, are two blowing nozzles 273, disposed above one another, which are part of a pneumatic cleaning device by means of which the measuring region sensed by the radar sensors is blown clear upon rotation of the honing tool, in order to render possible a measurement that is largely unimpaired by honing oil or cooling lubricant, chips and the like. One or more blowing nozzles such as, for example, blowing nozzle 273', can also be provided above and/or below the radar sensors in the axial direction.

A great advantage of the use of radar sensors in the measurement of workpiece surfaces in the context of fine machining consists in that, with the radar technique, in comparison with conventional methods, for example air measurement, the radar sensors can be disposed at a relatively large measurement distance from the surface to be measured, and in that exact measurement values can be acquired from a relatively large measurement span. In the detail drawing of FIG. 1, the radar sensor 152 is disposed at a measurement distance A, of up to 10 mm, from the bore wall (bore inner surface 165). The width B of the measurement span within which measurement values can be achieved with measurement accuracies of less than 1 μm is up to 2 mm in the case of the example. This is a marked enlargement as compared with the prior art. The large measurement distance and the large measurement span allow standardizations in the tool design, such that, for example, the same basic tool body can be used for a greater diameter range than hitherto. As a result, costs can be saved, inter alia. In addition, such a measuring system can also be used in honing stages wherein a very large amount of material is removed and wherein the currently possible measurement spans would be exceeded if conventional measuring systems were used. Mention can be made here, exemplarily, of certain pre-honing operations, or of the so-called "rough honing", wherein it is possible to achieve cutting capacities that are comparable with the cutting capacities of conventional fine boring methods, but with greater tool-life quantities nevertheless being achievable, owing to the continuous self-sharpening of the cutting bodies (see, for example, the technical article "Spanende Bearbeitung von Gusseisen mit Vermikulargraphit" by J. Schmid in: konstruieren+gießen 22 (1997) No. 4, pages 22 to 38). Typical amounts removed in rough honing can be, for example, in the range of between 0.3 and 0.5 mm relative to the diameter of the bore. Radar measuring systems can also be used to particular advantage in the case of the so-called performance machining by fine honing, which is described in the European patent application EP 1 932 620 A1 of the applicant.

The repetition accuracy of the recorded measurement values (depending on the surface accuracy and in the case of static measurement, i.e. with a non-rotating tool) is less than 0.5 μm. In the case of dynamic measurement, i.e. with a rotating tool, the recorded measurement value is a mean value of the distance between the radar sensor and the swept regions.

A scan frequency that is substantially higher in comparison with air measurement and which allows, for example, more than 100 or more than 1,000 measurements per second, opens up a plurality of new possibilities in measurement-aided fine machining. This is to be explained through an example from the field of honing. In honing, at present the typical spindle rotational speed of the honing spindle is approximately in the range of between 30 rpm and 300 rpm, with efforts to upwardly extend the upper limit. In this case, with a scan frequency of 1 kHz, between 200 and 2,000 measurement values can be recorded in the circumference of the bore upon a single revolution of the spindle. Even at higher rotational speeds, for example at 1,000 rpm, 60 measurement values can still be recorded per revolution, such that the measurement values are only 6° apart in the circumferential direction. This high angular resolution is sufficient to determine, through various measured diameters, not only the diameter of the bore, but also the roundness of the bore.

In addition to the rotary motion, a honing tool executes an additional, axial stroke motion. By setting the corresponding tool positions in the axial direction and the rotational angle against acquired diameter measurement values, it is also possible to calculate the macroscopic shape of the bore. Accordingly, during a typical honing period of a honing stage in the range of, for example, 20 seconds, approximately 20,000 measurement values can be generated in the case of a scan frequency of 1 kHz. It is therefore possible for the shape of the honed bore to be determined in a highly accurate manner during the honing process, such that, in particular, the temporal development of the shape of the machined bore can also be acquired.

This accuracy far exceeds the accuracy of the present-day post-process measuring stations that are integrated into a honing line. Such method variants can therefore replace post-process measurements, and thereby effect substantial cost savings. Accordingly, in the case of a preferred method variant, only one in-process measurement occurs, but no after-measurement after completion of the fine machining. Even if it is provided that the measurement system is in each case calibrated before the measurement of a bore, this is possible because of the rapidity of the measuring system, without an unacceptable increase in the overall process time.

The radar technique allows a large amount of information, about the position and orientation of the workpiece surface and, if appropriate, about its surface structure, to be determined from the secondary signal reflected from the workpiece surface. To explain some basic principles, differing measurement situations are represented schematically in FIGS. 3 to 5. In the figures, in each case a radar sensor is shown on the left and a portion of a workpiece, having a workpiece surface facing toward the radar sensor, is shown on the right. The primary and secondary radar signals running between the radar sensor and the workpiece surface are represented by wave lines and arrows for the direction of propagation.

Figure 3:
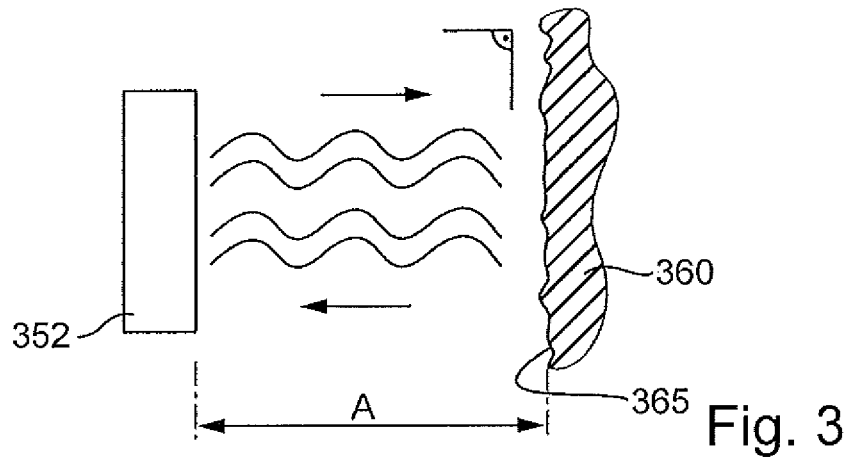
FIGS. 3 to 5 show, schematically, differing measuring situations for the purpose of explaining some basic principles in the use of radar sensors.

The radar sensor 352 in FIG. 3 generates a primary radar beam, which, in a substantially perpendicular manner, is incident upon the relatively smooth workpiece surface 365 of the workpiece 360 and is reflected from the latter, back to the radar sensor, more or less parallelwise in relation to the direction of incidence. For the purpose of distance determination, i.e. to determine the clear distance between the radar sensor and the workpiece surface, the evaluation device is used to acquire and evaluate the phase shift between the primary waves, running from the radar sensor to the workpiece surface, and the secondary waves reflected from the latter back to the radar sensor. In the configuration of FIG. 1, having the two diametrically opposite and simultaneously operated radar sensors 152, 153, it is possible to determine therefrom, in the case of a known diametric distance of the radar sensors within the honing tool and the distance measurements occurring at opposite locations, the bore diameter in the respective direction (parallel to the connecting line between the radar sensors) at a respective axial position of the bore.

Figure 4:
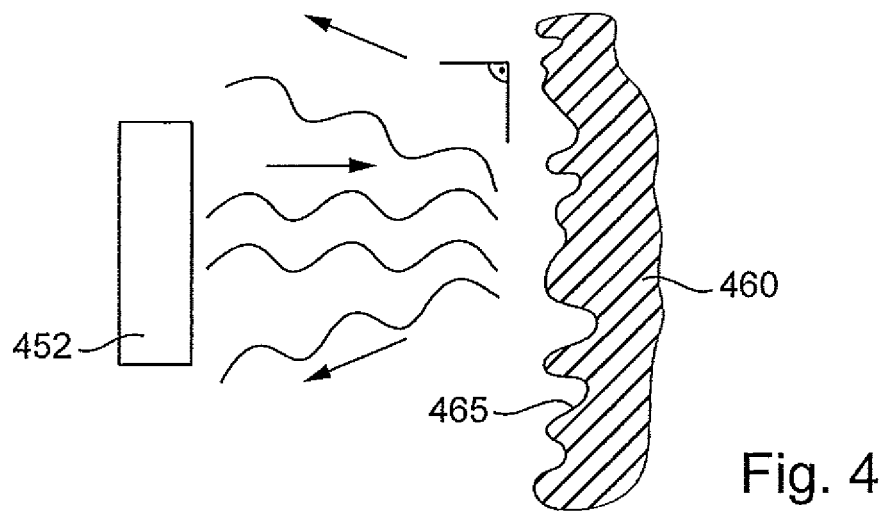

In the case of the example of FIG. 3, the relatively smooth bore wall reflects the radar radiation, substantially counter-parallelwise in relation to the incident radar beam, back in the direction of the radar sensor, such that only relatively small scatter losses occur, and a relatively strong secondary signal arrives at the radar sensor. Through comparison of the situations in FIGS. 3 and 4 it becomes evident that propositions concerning the surface roughness of the workpiece surface are also possible on the basis of the relative intensity of the reflected-back secondary signals received at the radar sensor. In the example of FIG. 4, the radar sensor 452 is opposite a relatively rough workpiece surface 465 of the workpiece 460. The radar sensor 452 is assumed to be identical in construction to the radar sensor 352 from FIG. 3. The radar sensor 452 likewise emits primary radar radiation substantially perpendicularly onto the workpiece surface, i.e. substantially parallelwise in relation to the workpiece normal of the macroscopically considered workpiece surface. Owing to the, in comparison with FIG. 3, greater surface roughness, however, greater proportions of the incident primary radiation are not reflected back to the radar sensor, but into solid angle regions outside the acquisition region of the radar sensor. As a result (the strength of the primary signal directed onto the workpiece surface being equal), the intensity of the reflected-back secondary signal is considerably weaker, in comparison with FIG. 3, than in the case of the smoother workpiece wall in FIG. 3. In this way, with appropriate calibration of the measuring sensors, the roughness of the workpiece surface can be inferred from the intensity of the secondary signal.

Figure 5:
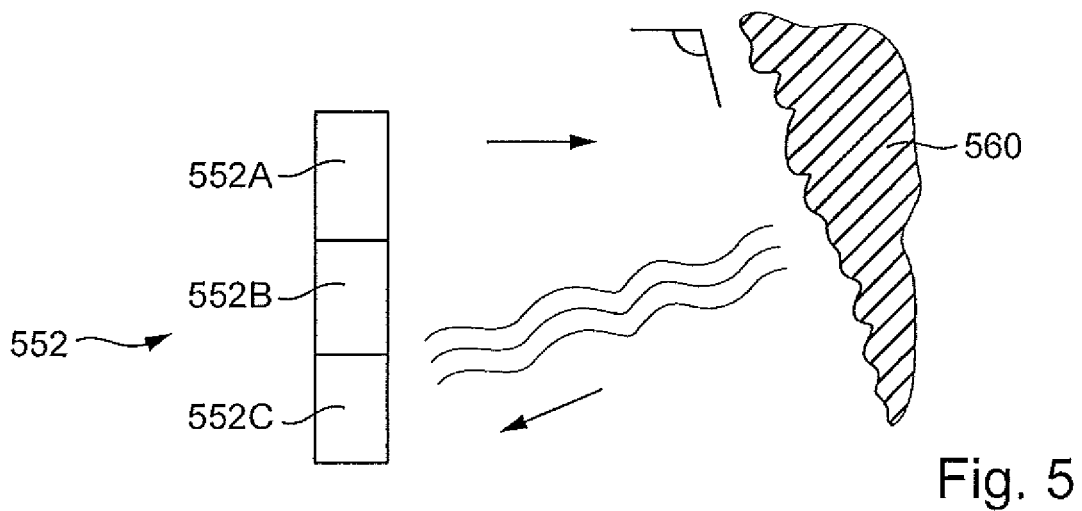

In FIGS. 3 and 4, the radar radiation reflected back from the workpiece is acquired integrally by the radar sensors, without differentiation positionally or in the angular space. In contrast thereto, the radar sensor 552 in FIG. 5 is designed for position-resolving acquisition of the intensity and/or the propagation time of the radar radiation reflected from the workpiece surface. The radar sensor 552 has a transmitting unit and a plurality of receiving units 552A, 552B and 552C, arranged next to one another in a spaced-apart manner. The workpiece 560 has a nominally cylindrical bore, the bore inner surface 565 of which is to be measured. The primary signal emitted by the radar sensor runs, in the radial direction in relation to the macroscopic bore axis, to the workpiece surface, and is reflected by the latter according to its surface roughness and its general orientation. In the axial portion shown, however, the portion of the bore wall is not perpendicular to the radial direction, but runs obliquely in relation thereto, such that the bore shape, at least in the bore portion shown, is not circular-cylindrical but, for example, conical. This becomes evident in the reflected radar signal, in that, substantially, the full intensity of the irradiated radar radiation does not get back to the sensor 552A in the radial direction, but is to a large extent reflected back obliquely in the direction of a more outwardly located part 552C of the radar sensor. Through position-resolving acquisition of the intensity of the radar radiation at the sensor arrangement, it is possible then to ascertain into which solid angle regions a particularly large amount of radiation is being reflected back. From this information, it is possible to deduce, for example, the shown oblique position of the bore wall and, consequently, valuable shape information about the macro-shape of the bore.

The exemplary embodiments of FIGS. 1 and 2 are based substantially on methods of internal honing. In principle, the described technology is also applicable in the case of other fine machining methods, in particular in belt finishing or in external honing of workpiece outer surfaces. Since, in the case of finishing, or external honing, less material is normally removed than in the case of internal honing, the measurement spans specified exemplarily above for internal honing can be reduced, such that, for example, the repetition accuracy of the measurement can be improved in ranges of 0.2 μm or less. The integration of the described radar measuring technique into already existing machining concepts can usually be realized without major modifications to the tools since, if necessary, the radar sensors can be constructed with very small outer dimensions.

Figure 6:
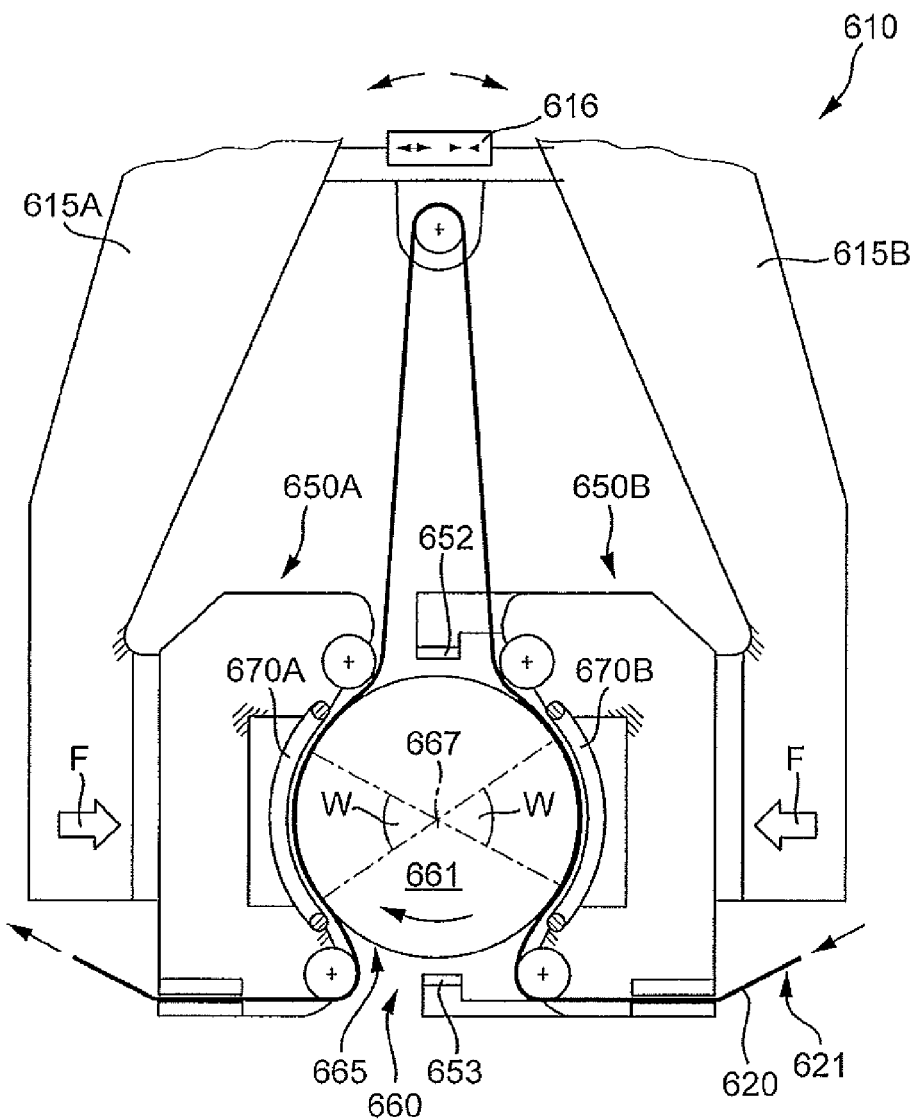
FIG. 6 shows a schematic view of an embodiment of a belt finishing machine, for finish machining of cylindrical workpiece outer surfaces, having an integrated radar measuring system.

FIG. 6 shows schematically, as an example, a portion of an apparatus, designed as a belt finishing machine, for the finish machining of circumferential surfaces of substantially cylindrical workpiece portions on workpieces, such as crankshafts or camshafts. The workpiece 660, in the case of the example a crankshaft, is rotated about its main axis 667 (workpiece axis) by a rotary device, not shown, and at the same time is put, by an oscillation device, into an axially short-stroke oscillating motion having strokes in the order of magnitude of a few millimeters. The belt finishing apparatus has a plurality of finishing units, disposed next to one another on a common machine frame. The units are each very narrow, for simultaneous machining of adjacently located workpiece portions. The apparatus shown has a plurality of finishing units for machining main bearings 661 (as represented) and finishing units, located therebetween, for machining pin bearings that go on orbital paths around the main axis 667, and with which the connecting rods engage during engine operation.

The finishing unit 610, shown portionally, in the form of a two-armed machining gripper is provided to machine the substantially cylindrical circumferential surface 665 of the main bearing. The finishing unit 610 has two machining arms (finishing arms, pressure arms) 615A, 615B, which are mounted so as to be pivotable about parallel pivot bearings in such a way that their free ends can be swiveled inwards, in the direction of the workpiece to be machined, or outwards, away from the workpiece. In the case of the example, the machining arms are connected to one another via a hydraulic and pneumatic force generator 616, which enables the machining force to press inwards against the workpiece with a predefined force F (arrows).

A finishing belt conveyor device, not shown in detail, provides a finishing belt 620, which is drawn off a supply roll, not shown, in the direction of the intake side of the finishing unit and, after use, is guided from the output side of the finishing unit, in the output direction, to a wind-up roll for used finishing belt. The finishing belt can be of any structural type known per se, for example it can have a largely non-compressible, low-stretch polyester film, which is provided with granular cutting material on its front side 621.

Fastened to each of the machining arms 615A, 615B, in the region of the free end on the side facing towards the workpiece, there is an exchangeable pressure device 650A, 650B, each of which is designed to press the finishing belt, provided with the cutting material, onto the workpiece surface, such that the finishing belt is pressed onto the workpiece surface, over an angular contact angle W, with a pressure force provided for the machining operation. The two pressure devices shown in FIG. 6 are substantially identical to one another in design and are arranged in mirror symmetry in relation to one another, in order to machine diametrically opposite regions of the rotating workpiece. During the machining, the finishing belt in this case is stationary relative to the pressure devices, such that the cutting speed required for the removal of material is generated exclusively by the rotational motion of the workpiece in combination with the superposed axial oscillation motion, in order to generate on the workpiece outer surface 665 a cross-grinding pattern that is advantageous for suitability as a plain bearing surface.

In the case of the example, the pressure devices each have a metallic pressure belt 670A and 670B, respectively, which is flexible to a limited extent and which is clamped between the limbs of respectively U-shaped carriers, as a result of which the pressure shoes can be used, within certain limits, for workpieces of differing diameters. Other structural types such as those shown, for example, in WO 2009/049868 A1, are likewise possible.

The belt finishing apparatus is equipped with a radar measuring system. This system has a radar sensor 652, which, by means of a carrier element provided with a through opening for the finishing belt, is fastened to the pressure device 650B such that it is at a defined radial distance from the workpiece surface. Diametrically opposite, a further radar sensor 653 is fastened to the pressure element 650B in a corresponding manner. During the finish machining, both information about the current diameter of the machined workpiece portion and information about any shape deviations, and information about the surface roughness and surface structure, can be acquired and, through feedback to the machine control system, used to control the machining process.

A radar measuring system having one or more radar sensors can also be integrated into other apparatuses for the fine machining of the workpiece surface, for example in a device for short-stroke honing in a centerless, through-feed operation, by means of which, for example, roll bodies, pistons, injector needles and such workpieces can be machined. In the case of ball machining also, for example in the finish machining of spherical workpiece portions on hip joint prostheses or other such workpieces, radar measurement can be used for diameter measurement and/or for measuring the macro-shape of the surface and/or of the surface condition, likewise in the case of toothed wheels. The capability for precise and rapid length measurement can be useful, in particular, in the machining of planetary gears.

The examples shown in detail show radar measuring systems whose radar sensors are integrated into fine machining tools, such that an in-process measurement is possible. It is also possible to design the measuring system as a measuring station that is separate from a machining center. In this case, a measuring head can be constructed in a manner similar to that of the honing tool in FIG. 2, but with no honing strips provided for the removal of material.

What is claimed is:

1. A method for the material-removing fine machining of a workpiece surface of a workpiece comprising:
    fine machining the workpiece surface using at least one fine machining tool selected from a group consisting of: an internal honing tool, an external honing tool and a belt finishing tool by removing material by means of geometrically undefined cutters; and
    measuring the workpiece surface by means of a measuring system,
    wherein the measuring step comprises:
    directing radar radiation onto the workpiece surface at at least one measuring position;
    acquiring radar radiation reflected from the workpiece surface, and
    evaluating the reflected radar radiation to determine at least one surface measurement value.

2. The method as claimed in claim 1, wherein radar radiation having frequencies from a range of between 20 GHz and 100 GHz is used.

3. The method of claim 1, wherein a phase shift between a primary radiation directed onto the workpiece surface and a secondary radiation reflected from the workpiece surface is determined and evaluated for the purpose of determining at least one surface measurement value.

4. The method of claim 3, wherein an effective wavelength of the radar radiation is adapted to the order of magnitude of a typical measurement distance in such a way that the phase shift is less than the wavelength.

5. The method of claim 1, wherein measurement values for a multiplicity of measurement locations on the workpiece surface are acquired, and at least one shape measurement value, representing a macro-shape of the workpiece surface, is determined from the measurement values.

6. The method of claim 5, wherein measurement values from at least 10 or at least 100 measurement locations are evaluated jointly.

7. The method of claim 1, wherein the workpiece and a radar sensor arrangement for the measurement are moved relative to one another;
    measurement values for a multiplicity of measurement locations on the workpiece surface are acquired in a temporally consecutive manner, and
    at least one shape measurement value, representing the macro-shape of the workpiece surface, is determined from the measurement values.

8. The method of claim 7, wherein the radar radiation is irradiated in pulses, at a scan frequency of at least 0.1 kHz, onto the workpiece surface.

9. The method of claim 1, wherein measurement locations are acquired multiple times during the measurement and, from the plurality of measurement values for a measurement location, a statistically evaluated measurement value is calculated for the measurement location.

10. The method of claim 1, wherein an intensity of the radar radiation reflected from the workpiece surface is determined and evaluated for the purpose of determining at least one surface measurement value.

11. The method of claim 10, wherein the intensity of the radar radiation reflected from the workpiece surface is acquired in a position-resolving manner at a plurality of positions within an extended acquisition region.

12. The method of claim 1, wherein at least one surface structure measurement value, representing the surface structure of the workpiece surface, is determined from the reflected measuring radiation.

13. The method of claim 12, wherein the surface structure measurement value represents at least one of a roughness of the surface and an orientation of machining marks.

14. The method of claim 1, wherein the measurement of the workpiece surface is performed on the workpiece clamped in a machining clamping device, the measurement being performed at least one of during or after the fine machining step;
a surface actual value that represents the current condition of the workpiece surface is determined, and
a difference between the surface actual value and a corresponding surface specified value is processed for the purpose of controlling the fine machining tool.

15. The method of claim 1, further comprising:
cleaning of a measurement span by blowing clear the measurement span by means of air or by means of another cleaning gas.

16. The method of claim 1, wherein the fine-machining comprises honing or finishing of workpiece portions having substantially rotationally symmetrically curved workpiece surfaces.

17. A measuring system comprising:
a fine machining tool of an apparatus for the material-removing fine machining of a workpiece surface of a workpiece;
at least one radar sensor arrangement having at least one radar sensor, the radar sensor being fitted on the fine machining tool such that the fine machining tool serves as a sensor carrier for the radar sensor
wherein the measuring system is configured to measure substantially rotationally symmetrically curved workpiece surfaces on workpiece portions machined by honing or finishing,
wherein the measuring system is configured as at least one of:
(i) a diameter measuring system;
(ii) a shape measuring system; and
(iii) a roughness measuring system;
wherein the measuring system is designed as an in-process measuring system; and
wherein the apparatus for the material-removing fine machining of a workpiece surface of a workpiece is a honing apparatus and the fine tool is a honing tool.

18. The measuring system of claim 17, wherein the measuring system is designed to perform the method as claimed in claim 1.

19. An apparatus for the material-removing fine machining of a workpiece surface of a workpiece, comprising:
at least one fine machining tool including geometrically undefined cutters for machining the workpiece surface by removing material, and
a measuring system for measuring the workpiece surface,
wherein the measuring system comprises a radar sensor arrangement having at least one radar sensor; and
wherein the apparatus is a honing apparatus and the fine machinin tool is a honing tool.

20. The apparatus of claim 19, wherein the measuring system comprises an evaluation device connected to a control device of the machining center in a signal transmitting manner,
wherein the evaluation device and the control device constitute a feedback control device for controlling the machining on the basis of surface measurement values obtained by means of the measuring system.

21. The apparatus of claim 20, wherein at least one of a machining time and a pressing force of cutting material carriers is controlled on the basis of surface measurement values of the measuring system.

* * * * *